United States Patent [19]

Shikama et al.

[11] Patent Number: 4,685,105
[45] Date of Patent: Aug. 4, 1987

[54] LOOP TRANSMISSION METHOD

[75] Inventors: Toshihiro Shikama, Kamakura; Takahisa Ota, Tokyo; Michihiro Ishizaka, Kamakura; Hirofumi Kira; Akira Horiguchi, both of Kobe; Yuji Kooi, Kamakura, all of Japan

[73] Assignee: Mitsubishi Denki Kabushiki Kaisha, Tokyo, Japan

[21] Appl. No.: 790,252

[22] Filed: Oct. 22, 1985

[30] Foreign Application Priority Data

Oct. 22, 1984 [JP] Japan ................... 59-223301

[51] Int. Cl.$^4$ ............................................ H04J 3/00
[52] U.S. Cl. ................................. 370/86; 370/89
[58] Field of Search .............. 370/89, 86, 85, 95; 340/825.5, 825.05

[56] References Cited

U.S. PATENT DOCUMENTS

| | | | |
|---|---|---|---|
| 4,277,843 | 7/1981 | Duquenne et al. | 370/89 |
| 4,320,502 | 3/1982 | deVeer | 370/89 |
| 4,482,999 | 11/1984 | Janson et al. | 370/86 |
| 4,528,661 | 7/1985 | Bahr et al. | 370/86 |

Primary Examiner—Douglas W. Olms
Assistant Examiner—Curtis Kuntz
Attorney, Agent, or Firm—Burns, Doane, Swecker & Mathis

[57] ABSTRACT

This invention relates to a time-division transmission method for a plurality of terminals connected to a looped transmission line, in which a plurality of slots being provided with regions, where three kinds: "Free", "Busy" or "Neutral" of access control information are set, are made to circulate on the transmission line, so that when the transmission apparatus at the terminal having data to be transmitted receives a slot of "Free", a necessary number of subsequent slots to the slot of "Free" are continuously used to carry out data transmission, the access control information at the slot in use is changed to "Busy", the access control information of a slot at the head of the slots not used is set to "Free", and an access control information of a slot subsequent to the above slot is set to "Neutral". Such method is adopted to increase a net amount of the data to be transmitted and reduce the processing for division and assembly of the data to be transmitted, thereby enabling the transmission efficiency to be improved.

4 Claims, 6 Drawing Figures

LOOP TRANSMISSION METHOD

BACKGROUND OF THE INVENTION

1. Field of the Invention

The present invention relates to a time division transmission method between apparatus, such as data terminals, telephones and fascimiles, connected to a looped transmission line.

2. Description of the Prior Art

Figure 1:
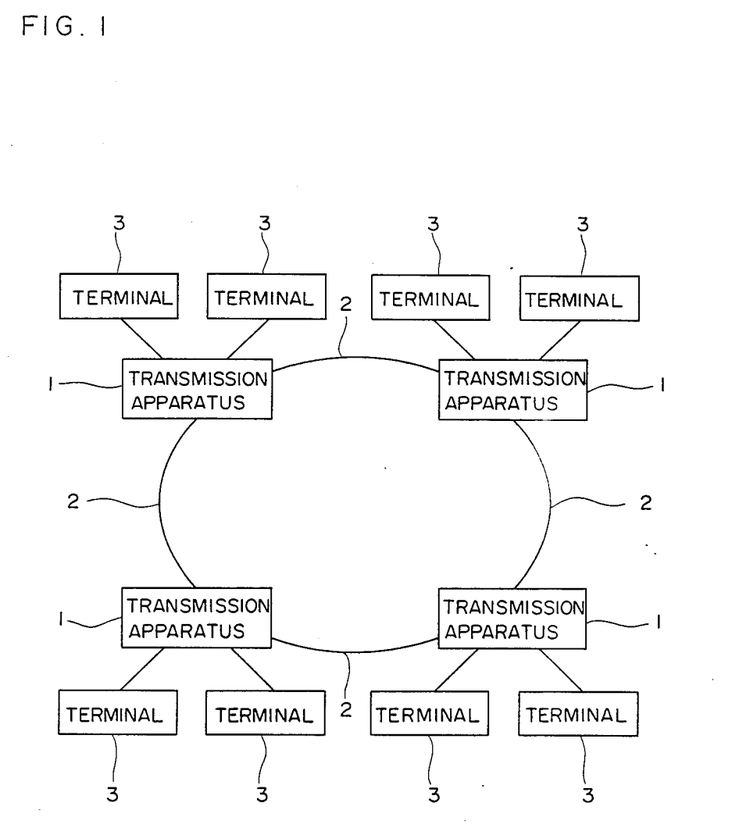
FIG. 1 is a schematic system diagram of a loop transmission system.

A channel multiplex system is well-known as the time division transmission method in a communication system in which a plurality of transmission apparatus 1,1 . . . are connected to a looped transmission line 2 and data terminals 3,3 . . . are connected to each transmission apparatus 1 as shown in FIG. 1.

Figure 2:
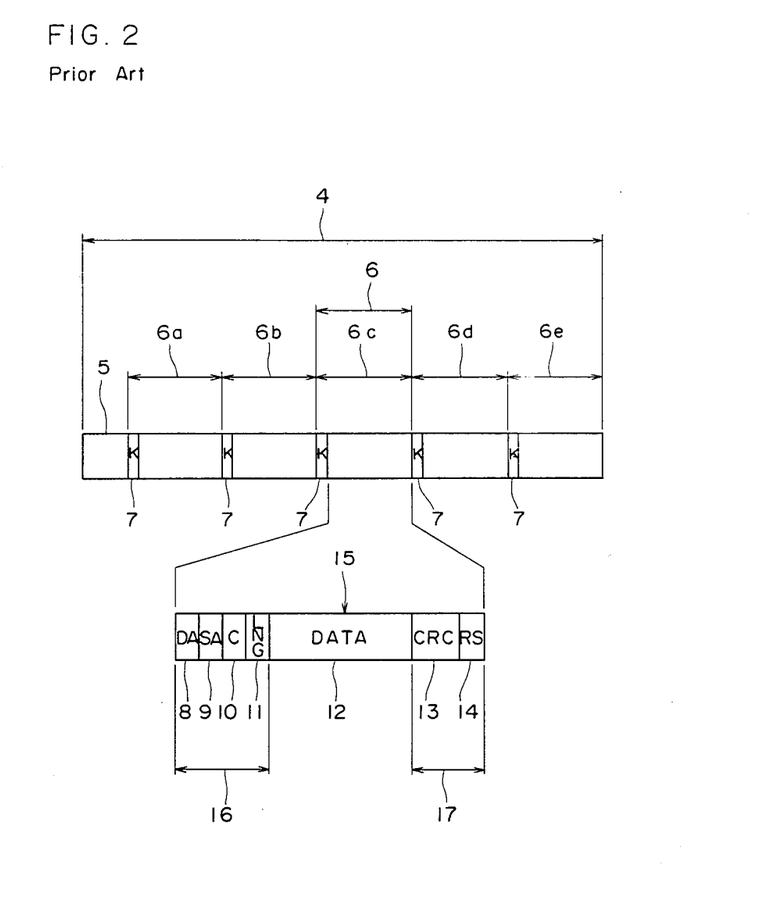
FIG. 2 shows a format of a frame at the conventional channel mutliplex system.

The channel multiplex system makes frames 4,4 . . . of a format as shown in FIG. 2 circulate on the looped transmission line 2, so that the transmission apparatus 1 having data to be transmitted given from the data terminal 3, occupies slots of the same number, for example, those 6c,6c . . . , among a plurality of slots 6,6 . . . prepared in each frame 4, thereby sending out the divided data to the slot 6c at each frame 4. For a format of the frame 4 having five slots 6a to 6e as shown in FIG. 2, five transmission apparatus 1,1 . . . carry out the time division communication. Next, such system will be detailed.

FIG. 2 shows the format of one frame 4, in which reference numeral 5 designates a frame management region, 7 designates an access control region, and 6 designates a slot. The slot 6 has a first slot 6a through a fifth slot 6e and also each slot 6 comprises the access control region 7 at the head and a transmission unit 15 shown with magnification on the lower portion in FIG. 2, the transmission unit 15 is provided before and behind data 12 essentially to be transmitted by the transmission apparatus 1 with a transmission unit header 16 and a transmission unit trailer 17. The header 16 comprises regions 8, 9, 10 and 11 where a destination address DA, a sending address SA, the control information C and an effective data length LNG are to be set, respectively, the trailer 17 comprising regions 13 and 14 where an error correction code CRC and the response information RS are to be set. In addition, the transmission apparatus 1 is so set that a delay time until the data transmitted from the transmission apparatus 1 returns thereto is an integer multiple of a frame cycle period.

Figure 3:
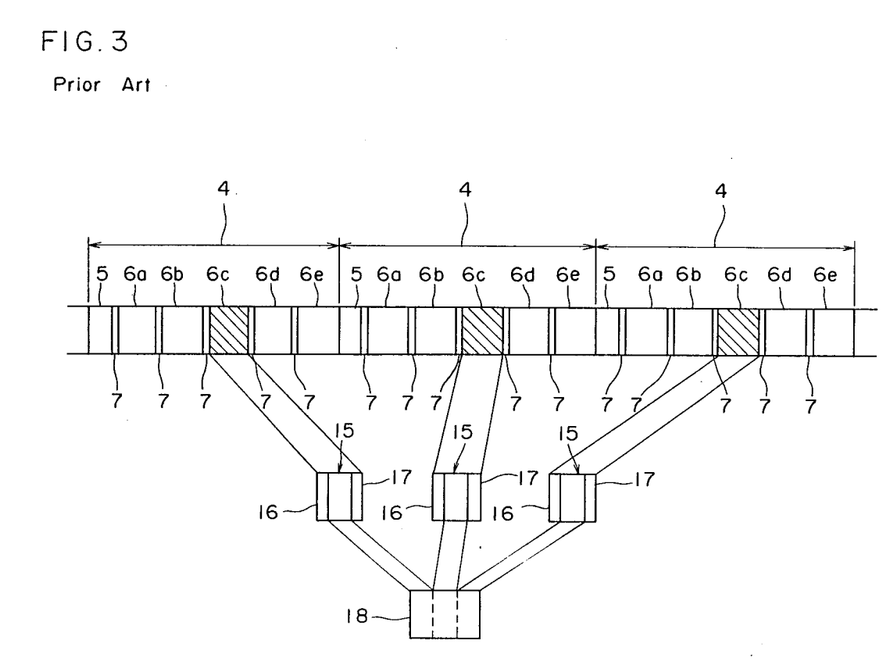
FIG. 3 shows a format exemplary of transmission of data at the channel multiplex system.

Next, explanation will be given on data transmission operation. In the channel multiplex system, any transmission apparatus 1 acquires the right of using the slot 6 according to the content of the access control region 7 provided at each slot 6, and thereafter, the transmission apparatus 1 can transmit data by use of the slot 6 of the same number at each frame 4 until the transmission apparatus 1 releases the right of using. In other words, the slot 6 of the same number at each frame 4 forms one channel for exchanging data between the transmission apparatus 1,1 . . . . FIG. 3 shows a case where five channels are provided.

In the channel multiplex system, the information of either "Free" or "Busy" is set in the access control region 7. When any transmission apparatus 1 acquires the right of using the slot 6, the access control region 7 thereof is set to "Busy" and the access control region 7 at the slot 6 whose right of using is not acquired by any transmission apparatus 1 becomes "Free".

The transmission apparatus 1, when requested of transmission, searches a slot 6 whose access control region 7 is set to "Free", and when the slot 6 set to "Free" is found, changes the slot set to "Free" to that set to "Busy" to thereby catch the slot 6 which is changed from being set to "Free" to "Busy", and the slots 6,6 . . . of the same number of the frame 4 whose slot is caught and the frames 4 subsequent to that are occupied, thus transmitting the date. Upon finishing the transmission, the access control region 7 of the slot 6 in use is returned to "Free" and then the slot 6 is released.

FIG. 3 shows an example of date transmission by the channel multiplex system. The transmission apparatus 1, when receiving the transmission data 18 to be transmitted from the date terminal 3, catches the slot 6 not in use, in other words, the slot 6 whose information of the access control region 7 is set to "Free". FIG. 3 is a view exemplary of the third slots 6c caught. Next, the transmission apparatus 1 divides the data 18 to be transmitted and each divided data is given the transmission unit header 16 and transmission unit trailer 17, thereby making the transmission unit 15. The transmission apparatus 1 sends out to the transmission line 2 the transmission units 15,15 . . . one by one with the timing of the third slots 6c at each frame 4. Upon finishing the transmission, an access control region 7 for each third slot 6c at the next frame 4 is set to "Free" and the third slots 6c,6c . . . are released.

Thus, in the conventional channel multiplex system, every transmission unit 15 is given the transmission unit header 16 comprising the destination address DA, sending address SA, and the transmission unit trailer 17 comprising the error correction code CRC and response information RS. Hence, an amount of annexed data required for transmission is larger than that of data to be essentially transmitted, thereby occurring the problem in that the transmission efficiency deteriorates.

Furthermore, in the channel multiplex system, the transmission apparatus 1 at the sending side divides the data 18 to be transmitted into the plurality of transmission units 15,15 . . . applied with the transmission unit headers 16,16 . . . and transmission unit trailers 17,17 . . . and transmits them. The transmission apparatus 1 at the receiving side must receive each transmission unit 15 to remove therefrom the transmission unit header 16 and transmission unit trailer 17, connect the successively received transmission units 15,15 . . . , and assemble them into the original data to be transmitted. Therefore, the transmission apparatus 1 is defective in complex construction due to the above processing. Especially, in a case where the transmission apparatus 1 receives the transmission units 15,15 . . . from the plurality of the transmission apparatus 1,1 . . . , the data 18 to be transmitted must be assembled respectively and simultaneously, thereby having the defect in that the processing becomes complex and the transmission efficiency deteriorates.

OBJECTS OF THE INVENTION

A first object of the invention is to provide a loop transmission method superior in transmission efficiency to the aforesaid channel multiplex system.

A second object of the invention is to provide a loop transmission method simple in construction of transmission apparatus, or simple insoftware thereof.

A third object of the invention is to provide a loop transmission method which simplifies the data division in the transmission apparatus and the processing of reassembly so as to increase the processing speed and, from the aspect, raise the transmission efficiency.

A fourth object of the invention is to provide a loop transmission method which can transmit without any hindrance the data so long that the entire data transmission is not yet completed even at the time when the transmission data once circles on a transmission line and returns to the transmission apparatus.

The above and further object and features of the invention will more fully be apparent from the following detailed description with reference to accompanying drawings.

DETAILED DESCRIPTION OF THE INVENTION

At first, explanation will be given in summary on a loop transmission method of the present invention.

Figure 4:
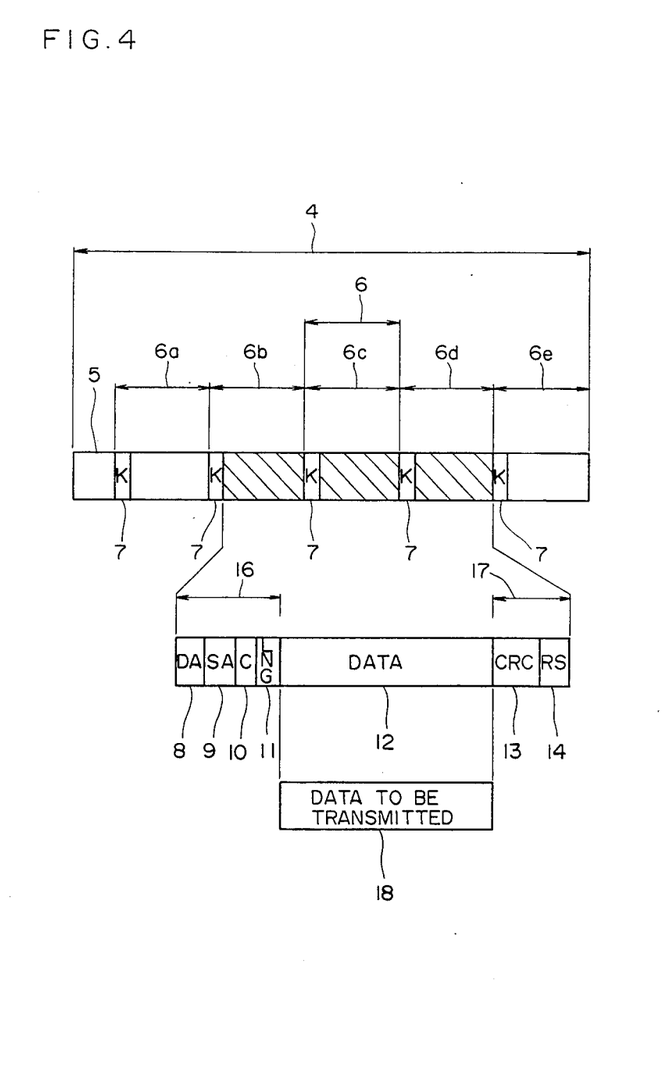
FIG. 4 shows a format of a frame at a loop transmission method of the invention.

The loop transmission method of the invention makes only one frame 4 in a format as shown in FIG. 4 circulate along a looped transmission line 2, the frame 4 having a plurality (five in an example in the drawing) of slots 6,6..., each of which is provided with an access control region 7. On the access control region 7 is put the access control information including three statuses of "Free", "Busy" or "Neutral". The access control region 7 of slot 6 in use of data transmission is represented by "Busy" and other slots 6,6... are represented by "Free" or "Neutral", Free" being put on the foremost slot 6 only among a group of slots 6,6... not in use for date transmission.

The data 18 to be transmitted is not divided, but the transmission unit header 16 and transmission unit trailer 17 are attached before and behind the whole of the data 18 to be transmitted to form a transmission unit, so that the entire transmission unit is sent out to the slot 6 whose access control region is set to "Free", without being divided, or by being divided from the slot 6 to the subsequent one or a plurality of slots 6,6... needful corresponding to an amount of data. In other words, since the transmission unit header 16 and trailer 17 are attached only to the whole of the data 18 to be transmitted or data 12, for the data amount across two or more slots, the transmission method of the invention increases a percentage of an essential amount of the data to be transmitted in comparison with the conventional channel multiplex system, thereby improving the transmission efficiency to that extent.

In greater detail, each frame 4 companies one frame management region 5 and a plurality of slots 6,6.... The frame management region 5 carries thereon the information, such as number of slots, validity or invalid of frame. The frame 4 in this embodiment has five slots of from first 6a to fifth 6e, and on the access control region 7 positioned ahead of each slot 6 is set either one of the aforesaid three informations K, so that the frame 4 circulates, in such condition, along the looped transmission line 2.

The transmission apparatus 1 given the data 18 to be transmitted from the data terminal 3 attaches the transmission unit header 16 and transmission unit trailer 17 in front and the rear of the data 18 (12), to thereby form the transmission unit, and supervises the information K in the access control region 7 of the slot 6.

The transmission unit header 16 comprises a destination address (DA) region 8, a sending address (SA) region 9, a control information (C) region 10 and an effective data length (LNG) region 11, the trailer 17 comprising an error correction code (CRC) region 13 and a response information (RS) region 14, which are as the same as those in the channel multiplex system.

When the slot 6 whose access control region 7 is set to "Free" arrives at the transmission apparatus 1 having the data to be transmitted, the transmission apparatus 1 sets the access control region 7 of the slot 6 "Busy" and transmits the data by use of the slot 6, where the transmitting data includes the transmission unit header 16 and transmission unit trailer 17. In a case where the data transmission can not complete by said slot 6 only, the transmission apparatus 1 continuously uses the subsequent slots 6,6... to transmit the data, wherein the transmission apparatus 1 sets "Busy" the access control region of each slot having transmitting data.

Upon completing the data transmitting, the transmission apparatus 1 sets "Free" an access control region 7 of the next slot 6.

Referring to FIG. 4, when the access control region 7 of the second slot 6b is set to "Free", the slot 6b and the subsequent slots 6c to 6d are used to transmit the data, in which the access control regions 7 of the slots 6b, 6c and 6d are changed to "Busy" and that 7 of the subsequent slot 6e is changed to "Free". The access control region 7 of the slot 6a further subsequent to the above is kept "Neutral".

Figure 5:
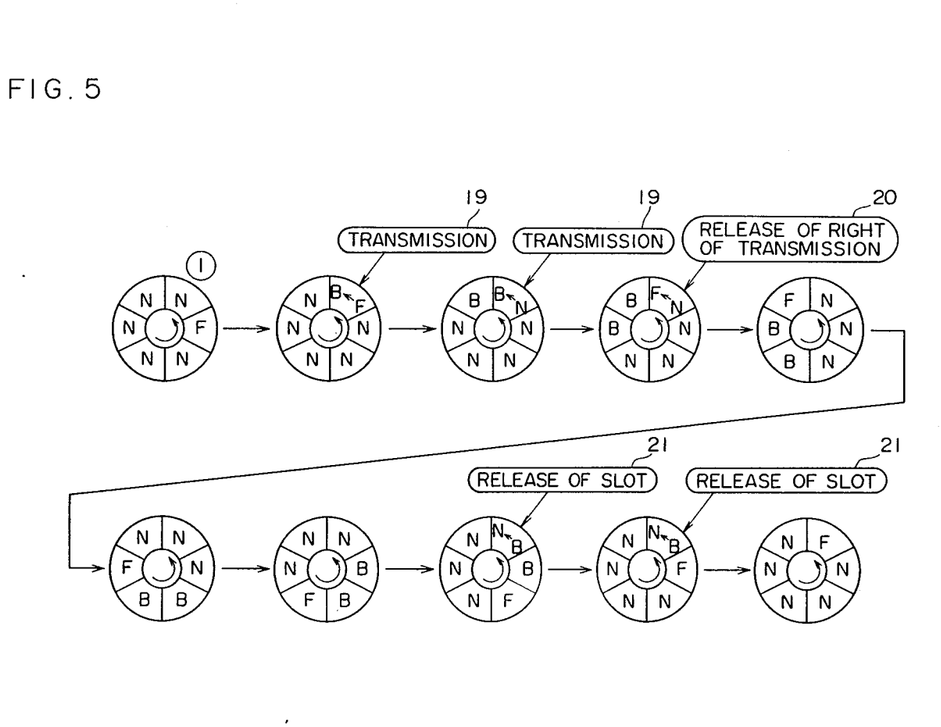
FIGS. 5 and 6 are transition diagrams of the access control information.

FIG. 5 shows an example of transition of the access control information K in the embodiment of the loop transmission method of the invention, in which reference numeral 19 designates transmission, 20 designates release of the right of transmission, 21 designates release of the slot, F designates "Free", N designates "Neutral", and B designates "Busy". FIG. 5 shows the circulations of six slots 6,6... on the looped transmission line 2, in which reference letters F, N and B, which are written in the regions of a circle divided equally into six parts, represent the content of the access control information K of the respective six slots 6,6.... Also, the reference patterns of the plural circles each show the pattern of the access information K on the transmission line 2 after the lapse of time for one slot each time the circle moved lefrwardly one by one. When the data transmission is not at all carried out, on the transmission line 2, the access control information K of one slot 6 is set to "Free" and other slots 6,6... are set to "Neutral", thereby rotating counterclockwise on the transmission line 2.

Now, we would assume that the transmission apparatus 1 having the data 18 to be transmitted is disposed upwardly rightwardly of the circle. When the transmission apparatus 1 receives the information "Free" (F) on the transmission line 2, the transmission apparatus 1 changes the information from "Free" to "Busy" (B), and thereafter carries out transmission 19. In FIG. 5, two slots 6,6 are used to carry out the transmission 19. Upon finishing the transmission 19, at the next slot, the transmission apparatus 1 changes the access control information K from "Neutral" (N) to "Free (F) to carry out the release 20 of the right of transmission.

After the release 20 of the right of transmission, the slot 6 transmitted from the transmission apparatus 1, after the lapse of time of travelling on four slots, returns to said transmission apparatus 1. The transmission apparatus 1 changes the access control information K of the two transmitted slots 6,6 by the transmission apparatus 1 from "Busy" (B) to "Neutral" (N) to thereby carry the release 21 of the slot 6, because the data of slot 6 which returns after once circulating on the transmission line 2, has already been transmitted to the transmission apparatus 1 of destination.

Figure 6:
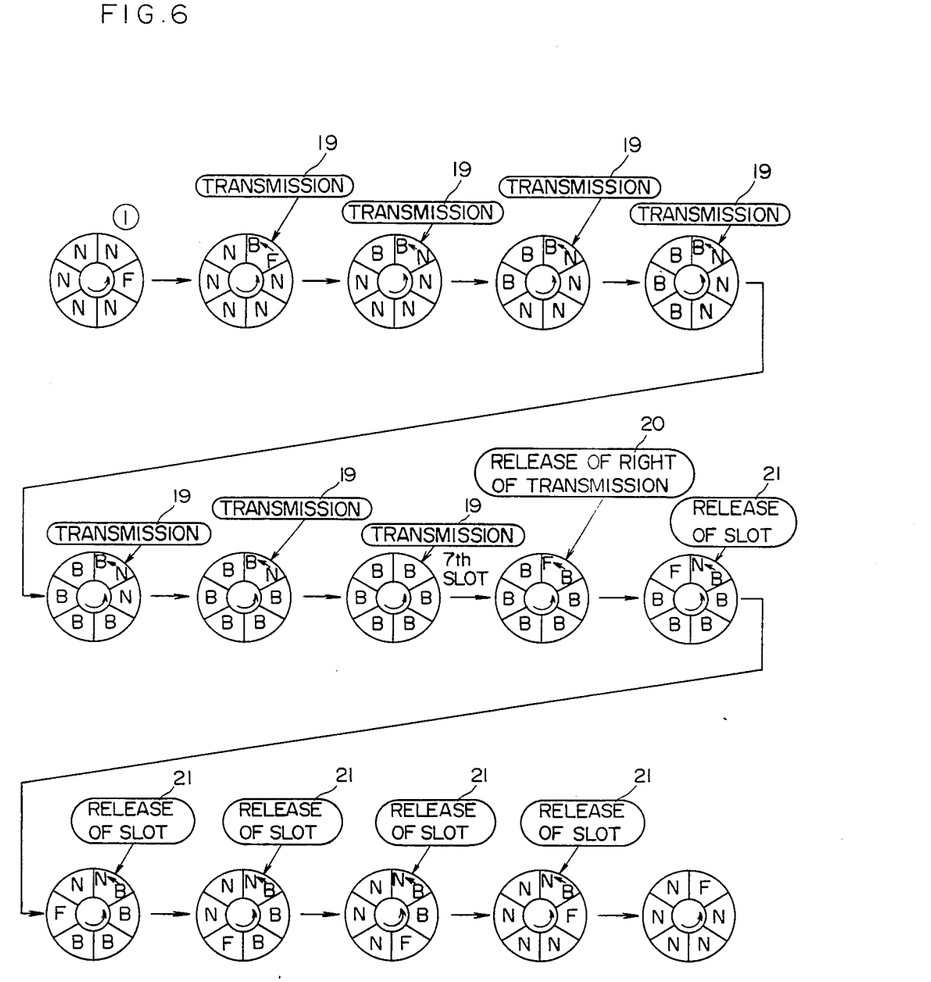

Although FIG. 5 shows that the data length is transmitted by two slots 6,6 enough when the six slots are used. In a case where long data of seven or more slots is transmitted for the six slots 6,6 . . . , the slot 6 transmitted by the transmission apparatus 1 itself returns thereto before the data transmission does not complete as shown in FIG. 6. At this time, the transmission apparatus 1 keeps the access control information K "Busy" (B) as it is and transmits by the returned slot the transmitting data by the seventh slot. After the data whose data length corresponds to the seventh slot is thus transmitted, the transmission apparatus 1 changes the access control information of next slot 6 from "Busy" (B) to "Free" (F), thereby releasing the right of transmission, and the changes the access control information of the subsequent slots 6,6 . . . from "Busy" (B) to "Neurtral" (N), and releasing the slot. When the slot 6 having the access control information set to "Free" (F) returns, the change of access control information is stopped.

In addition, when the plurality of transmission apparatus 1,1 . . . are requested of transmission simultaneously with each other, since only one access control information K of "Free" is circulating on the transmission line 2, one of the plurality of transmission apparatus 1,1 . . . will in advance catch the slot 6 set to "Free". The transmission apparatus 1 having caught the slot 6 continuously sets the access control information K of the subsequent slots 6 "Busy", so that these slots 6,6 . . . are used to transmit the data. Upon finishing the transmission, the access control information K of the next slot 6 is set to "Free". Then, the slot 6 keeping the access control information K set to "Free" is caught by another transmission apparatus 1 and the data is transmitted thereby.

In a case where the plurality of transmission apparatus 1,1 . . . thus are requested of transmission, the transmission is carried out in order of arrival of the slots 6,6 . . . keeping the access control information K set to "Free". Also, when a certain transmission apparatus 1 once begins transmission, the slot 6 keeping the access control information K set to "Free" does not appear on the transmission line 2 until the transmission is completed. Therefore, each of the transmission apparatus 1,1 . . . need only receive the data at once from another one transmission apparatus 1, thereby being simple in construction.

In the aforesaid embodiment, the transmission line 2 is time-divided into five or six slots, but the number of slots may of course not be limited to the above. When the number of slots is inceased, the slot is of small size so as to enlarge a percentage of the transmission capacity to be taken by the access control information, thereby deteriorating the transmission efficiency. On the contrary, when the number of the time-divided slots is reduced, the slot is of large-size so that when short data is transmitted, the region of slot is in excess, thereby deteriorating the transmission efficiency. Hence, the number of slots may be decided in consideration of the above relation.

As seen from the above, the loop transmission method of the invention attaches the series data to be transmitted one transmission unit header and one transmission unit trailer, thereby having the transmission efficiency higher than the conventional channel multiplex system. Also, the division and reassembly of the transmission data are needless so that the transmission apparatus is simple in construction and software, and reduces the time taken for receiving in comparison with the conventional one.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A loop transmission method which makes a plurality of time-divided slots circulate on a looped transmission line connecting a plurality of transmission apparatuses, including a transmission apparatus sending out data having a destination address in said slots, and a transmission apparatus for receiving said data, thereby carrying out communication between said plurality of transmission apparatuses, characterized in that each of said slots is provided with an access control region where the access control informations of "Free", "Busy" or "Neutral" are to be set, in response to data transmission not being carried out, an access control information at one of said plurality of slots is set to "Free" and access control information at other slots are set to "Neutral" to thereby make said plurality of slots circulate on said looped transmission line, in response to a transmission apparatus, having data to be transmitted, receiving an access control information of "Free" from a certain slot, said transmission apparatus uses said certain slot and a necessary number of the slots subsequent to said slot and sends out the data to the slots, at which time the access control information at each of said slots transmitting the data is set to "Busy", and after the data transmission is completed, the access control information at the next slot is set to "Free", and in response to completion of data transmission, said transmission apparatus, when said slot transmitted data thereby returns to the same slot after it once circulates on said looped transmission line, sets the access control information at said slot to "Neutral".

2. A loop transmission method as set forth in claim 1, wherein data sent out to one or a plurality of said slots is the data to be transmitted and a header and a trailer attached respectively before and behind it.

3. A loop transmission method which makes a plurality of time-divided slots circulate on a looped transmission line connecting a plurality of transmission apparatuses, including a transmission apparatus sending out data having a destination address in said slots, and a transmission apparatus for receiving said data, thereby carrying out communication between said plurality of transmission apparatuses, characterized in that     each of said slots is provided with an access control region where the access control informations of "Free", "Busy" or "Neutral" are to be set,     in response to data transmission not being carried out, an access control information at one of said plurality of slots is set to "Free" and access control informations at other slots are set to "Neutral" to thereby make said plurality of slots circulate on said looped transmission line.

in response to a transmission apparatus, having data to be transmitted receiving an access control information of "Free" from a certain slot, said transmission apparatus uses said certain slot and a necessary number of the slots subsequent to said slot and sends out the data to the slots, at which time the access control information at each of said slots transmitting the data is set to "Busy", and after the data transmission is completed, the access control information at the next slot is set to "Free",     in response to said data transmission not yet being completed, said transmission apparatus, when said slot transmitted data thereby returns to the same slot after it circulates once on said looped transmission line, sets the access control information at said slot to "Busy", and the untransmitted data is sent out to said slot in place of the data in said slot having once circulated on said looped transmission line, and     in response to completion of data transmission, said transmission apparatus, when said slot transmitted data thereby returns to the same slot after it once circulates on said looped transmission line, sets the access control information at said slot to "Neutral".

4. A loop transmission method as set forth in claim 3, wherein data sent out to one or a plurality of said slots is the data to be transmitted and a header and a trailer attached respectively before and behind it.

* * * * *